UNITED STATES PATENT OFFICE 2,617,834

HYDRATION OF OLEFINS

Joseph E. Woodbridge, Pensauken, N. J., assignor to The Atlantic Refining Company, Philadelphia, Pa., a corporation of Pennsylvania No Drawing. Application February 21, 1950, Serial No. 145,589

8 Claims. (Cl. 260—631)

The present invention relates to the conversion of olefins into alcohols, and relates more particularly to the hydration of aliphatic mono-olefins in the presence of an aqueous solution of $BF_3$ and $SO_2$ at $+25°$ C. to $-50°$ C.

In accordance with this invention, an olefin containing from 2 to 20 carbon atoms is contacted with an aqueous solution of $BF_3$ having a specific gravity between 1.65 and 1.75 at 25° C. and liquefied $SO_2$ at a temperature between $+25°$ C. and $-50°$ C. for a period of time sufficient to effect hydration of the olefin to the corresponding alcohol. After conversion, the alcohol is separated from the reactant mixture, and unconverted olefin may be recycled for further treatment.

The olefins which may be employed are preferably primary and secondary olefins including ethylene, propylene, butene-1, butene-2, and the higher homologous primary and secondary pentenes, hexenes, heptenes, nonenes, decenes, and the like. The aliphatic cyclo-olefins such as cyclopentene, cyclohexene, cycloheptene, cyclooctene, and the alkyl cyclo-olefins in which the double bond is not adjacent the carbon atom bearing the alkyl group are also suitable for use.

The hydrating agent comprising an aqueous solution of $BF_3$ is prepared by passing gaseous $BF_3$ into cooled water until the specific gravity of the solution falls within the range of 1.65 and 1.75 at 25° C. Solutions having a specific gravity above 1.75 are undesirable since they convert the olefin to polymers at the expense of hydration. For example, solutions having a specific gravity of 1.79–1.80 give mostly olefin polymer with little or no alcohol. On the other hand, solutions having a specific gravity below 1.65, for example, 1.60, are too dilute to be satisfactory, since at low temperatures ($-50°$ C. to $-18°$ C.) ice will form to an undesirable extent, while at higher temperatures (25° C.) the solution will be inactive due to its high water content. Therefore, it is essential to maintain the aqueous solution of $BF_3$ at a gravity between 1.65 and 1.75 for use under the hydration conditions of this invention. The weight ratio of aqueous $BF_3$ solution to olefin may range between 0.1 and 2.0 to 1, depending upon the nature of the olefin, the hydration temperature, the efficiency of contacting, and the amount of $SO_2$ employed. In general, about 1 part by weight of $BF_3$ solution to 1 part by weight of olefin is satisfactory, the only requirement being that sufficient water is present to hydrate a substantial proportion of the olefin.

The sulfur dioxide ($SO_2$) employed in conjunction with the aqueous solution of $BF_3$ functions to activate the hydration catalyst, to inhibit olefin polymerization, and when used in substantial amounts, to also cause liquid phase separation, i. e., unreacted olefin (and traces of polymer); liquid $SO_2$ and alcohol; and aqueous $BF_3$ saturated with $SO_2$. The weight ratio of $SO_2$ to olefin may range between 0.05 and 5 to 1, equal weights being satisfactory in most cases and giving rise to liquid phase separation permitting ready recovery of the products and unreacted components, and recycling of the latter. The hydration operation is preferably carried out under conditions in which all of the components are substantially in the liquid phase, and in some cases, this will require a closed system operating under superatmospheric pressure.

The present invention may be further illustrated by the following examples, which, however, are not to be construed as limiting the scope thereof.

Hydration catalysts were made up by passing gaseous $BF_3$ through cooled water until the desired specific gravity was attained. 100 gm. of the aqueous solution of $BF_3$ was then added slowly to 114 gm. of liquid $SO_2$ at $-34°$ C. in a vessel provided with a mechanical stirrer. To this mixture was added, with stirring, 1 mole of the desired olefin. The mixture was vigorously stirred for ¾ to 4 hours, while maintaining the temperature between $-23°$ C. and $-18°$ C. The reaction mixture, upon completion of the stirring, was poured into 75 gm. of water and allowed to stratify in layers. The aqueous $BF_3$ layer was drawn off, the $SO_2$ contained therein then being recovered by vaporization, and the remaining layer comprising alcohol, unconverted olefin and traces of polymers, was washed with water and then with sodium carbonate solution to remove traces of $SO_2$. Olefin and polymer remaining in the alcohol were separated by fractional distillation. Recycling of the unconverted olefin substantially increased the ultimate yield of alcohol. The results for the hydration of butene-2, octene-1, and cyclohexene are tabulated below.

| No. | Olefin | Sp. Gr. of $BF_3$—$H_2O$ at 25° C. | Hydration period (hours) | Alcohol—Percent Yield Once-through | Alcohol—Percent Yield Recycling |
|---|---|---|---|---|---|
| 1 | butene-2 | 1.71 | 1.5 | 20.8 | 37.0 |
| 2 | octene-1 | 1.73 | 0.75 | 34.4 | |
| 3 | do | 1.71 | [1] 1.5 | 24.3 | 44.2 |
| 4 | do | 1.71 | 2.0 | 35.4 | 44.6 |
| 5 | do | 1.68 | 3.0 | 47.3 | |
| 6 | do | 1.71 | 4.0 | 45.4 | 48.7 |
| 7 | do | 1.71 | [2] 2.5 | 39.6 | 49.0 |
| 8 | cyclohexene | 1.71 | 1.75 | 14.0 | 57.0 |
| 9 | octene-1 | 1.71 | [1] 1.5 | 3.0 | |
| 10 | do | 1.73 | [3] 1.5 | 1.0 | |

[1] Contained n-pentane diluent in an amount equal to the octene-1.
[2] Contained ½ the amount of liquid $SO_2$, i. e., 57 gm.
[3] Contained no liquid $SO_2$, resulting in high conversion to polymers.

From the above data, it is apparent that substantial hydration of primary and secondary olefins into alcohols is achieved at relatively low temperatures using aqueous solutions of $BF_3$ of the proper specific gravity and in the presence of sulfur dioxide. In the absence of $SO_2$, the olefins are converted almost completely to olefin polymers. Tertiary olefins are not usually suitable for use in accordance with this invention, since they appear to be more readily polymerized than hydrated. Likewise, if the specific gravity of the aqueous solution of $BF_3$ is too high, i. e. above 1.75, the primary and secondary olefins tend to polymerize even in the presence of $SO_2$. For example, octene-1 treated with aqueous $BF_3$, having a specific gravity of 1.79 at 25° C. and liquid $SO_2$ at —23° C. to —18° C., was converted almost completely to octene polymers. However, with the catalysts and under the conditions specified herein, substantial yields of alcohols can be obtained from the primary and secondary olefins. In some cases, it is desirable to dilute the olefin with an inert solvent to lower the viscosity prior to and during the hydration reaction. Such solvents or diluents include liquefied propane, butane, pentane, hexane, petroleum ether, 88° petroleum naphtha, and similar inert essentially paraffinic hydrocarbons or mixtures thereof. The quantity of diluent to be employed will depend upon the nature of the olefin and the hydration temperature, however, quantities of the order of 0.25 to 5 volumes of diluent per volume of olefin may be used, equal volumes usually being satisfactory. The process of the present invention may be carried out batch-wise in suitable vessels such as stirring autoclaves, or continuously in vessels permitting withdrawal of a portion of the reactant mixture, separation of the resultant alcohol, and recycling of the catalyst and unconverted olefin. Following hydration, the reactants and products may be separated and recovered by decantation, fractional distillation, or other conventional methods.

I claim:

1. A method for converting primary and secondary olefins into an alcohol, which comprises contacting said olefin with an aqueous solution of $BF_3$ having a specific gravity between 1.65 and 1.75 at 25° C. and liquefied $SO_2$ at a reaction temperature of +25° C. to —50° C. the weight ratio of $SO_2$ to olefin being from 0.05 to 5:1, and recovering the resulting alcohol from the reactant mixture.

2. A method for converting primary and secondary olefins into an alcohol, which comprises contacting said olefin with an aqueous solution of $BF_3$ having a specific gravity between 1.65 and 1.75 at 25° C. and liquefied $SO_2$ at a reaction temperature of +25° C. to —50° C., the weight ratio of aqueous $BF_3$ to olefin being from 0.1 to 2:1 and the weight ratio of $SO_2$ to olefin being from 0.05 to 5:1, and recovering the resulting alcohol from the reactant mixture.

3. A method for converting primary and secondary olefins into an alcohol, which comprises contacting said olefin, in the presence of an inert, liquid paraffinic hydrocarbon diluent, with an aqueous solution of $BF_3$ having a specific gravity between 1.65 and 1.75 at 25° C. and liquefied $SO_2$ at a reaction temperature of +25° C. to —50° C., the weight ratio of aqueous $BF_3$ to olefin being from 0.1 to 2:1 and the weight ratio of $SO_2$ to olefin being from 0.05 to 5:1, and recovering the resulting alcohol from the reactant mixture.

4. A method for converting an aliphatic monoolefin containing from 2 to 20 carbon atoms into an alcohol, which comprises contacting said olefin with an aqueous solution of $BF_3$, having a specific gravity between 1.65 and 1.75 at 25° C. and liquefied $SO_2$ at a reaction temperature of +25° C. to —50° C., and recovering the resulting alcohol from the reactant mixture.

5. A method for converting an aliphatic monoolefin containing from 2 to 20 carbon atoms into an alcohol, which comprises contacting said olefin with an aqueous solution of $BF_3$ having a specific gravity between 1.65 and 1.75 at 25° C. and liquefied $SO_2$ at a reaction temperature of +25° C. to —50° C., the weight ratio of aqueous $BF_3$ to olefin being from 0.1 to 2:1 and the weight ratio of $SO_2$ to olefin being from 0.05 to 5:1, and recovering the resulting alcohol from the reactant mixture.

6. A method for converting butene-2 into 2-butanol, which comprises contacting butene-2 with an aqueous solution of $BF_3$ having a specific gravity between 1.68 and 1.72 at 25° C. and liquefied $SO_2$ at a reaction temperature of —30° C. to —18° C., and recovering the resulting 2-butanol from the reactant mixture.

7. A method for converting cyclohexene into cyclohexanol, which comprises contacting cyclohexene with an aqueous solution of $BF_3$ having a specific gravity between 1.68 and 1.72 at 25° C. and liquefied $SO_2$ at a reaction temperature of —30° C. to —18° C., and recovering the resulting cyclohexanol from the reactant mixture.

8. A method for converting octene-1 into 2-octanol, which comprises contacting octene-1 with an aqueous solution of $BF_3$ having a specific gravity between 1.68 and 1.72 at 25° C. and liquefied $SO_2$ at a reaction temperature of —30° C. to —18° C., and recovering the resulting 2-octanol from the reactant mixture.

JOSEPH E. WOODBRIDGE.

REFERENCES CITED

The following references are of record in the file of this patent:

UNITED STATES PATENTS

| Number | Name | Date |
|---|---|---|
| 2,014,740 | Larson | Sept. 19, 1935 |
| 2,135,455 | Loder | Nov. 1, 1938 |
| 2,220,307 | Whiteley, Jr. et al. | Nov. 5, 1940 |
| 2,442,643 | Elwell et al. | June 1, 1948 |
| 2,442,644 | Elwell et al. | June 1, 1948 |
| 2,442,645 | Elwell et al. | June 1, 1948 |
| 2,457,882 | Frey | Jan. 4, 1949 |